United States Patent
Allen (10) Patent No.: US 12,219,908 B2
(45) Date of Patent: Feb. 11, 2025

(54) METAL PLANTER ASSEMBLY

(71) Applicant: Collier Metal Specialties, Ltd, Garland, TX (US)

(72) Inventor: Robert Glen Allen, Mesquite, TX (US)

(73) Assignee: Colmet LLC, Garland, TX (US)

( * ) Notice: Subject to any disclaimer, the term of this patent is extended or adjusted under 35 U.S.C. 154(b) by 330 days.

(21) Appl. No.: 17/003,165

(22) Filed: Aug. 26, 2020

(65) Prior Publication Data
US 2021/0059125 A1   Mar. 4, 2021

Related U.S. Application Data

(60) Provisional application No. 62/892,288, filed on Aug. 27, 2019.

(51) Int. Cl.
| | | |
|---|---|---|
| *A01G 9/02* | (2018.01) | |
| *F16B 5/00* | (2006.01) | |
| *F16B 5/02* | (2006.01) | |
| *A01G 9/00* | (2018.01) | |

(52) U.S. Cl.
CPC .............. *A01G 9/02* (2013.01); *F16B 5/0056* (2013.01); *F16B 5/02* (2013.01); *A01G 2009/003* (2013.01)

(58) Field of Classification Search
CPC ...... A01G 2009/003; A01G 9/02; B65D 7/32; B65D 7/30; B65D 7/24; B65D 7/12; B65D 7/06; B65D 7/00; B65D 7/28; B65D 7/42; B65D 11/18; B65D 11/1873; F16B 5/002; F16B 5/0024; F16B 5/0028; F16B 5/0044; F16B 5/0004; F16B 5/0291; F16B 5/02

USPC ........ 220/4.33, 4.28; 47/66.1, 66.2, 66.3, 68
See application file for complete search history.

(56) References Cited

U.S. PATENT DOCUMENTS

| | | | | |
|---|---|---|---|---|
| 402,722 | A * | 5/1889 | Cook | A01G 9/0295 47/73 |
| 1,378,614 | A * | 5/1921 | McLeod | B65D 9/18 217/15 |
| 1,497,535 | A * | 6/1924 | Bell | B65D 7/24 220/4.09 |
| 1,752,134 | A * | 3/1930 | Woodman | B65D 7/30 220/4.09 |

(Continued)

FOREIGN PATENT DOCUMENTS

| | | | | |
|---|---|---|---|---|
| CN | 106542164 A | * | 3/2017 | ............ B65D 11/18 |
| CN | 106979200 A | * | 7/2017 | |

(Continued)

*Primary Examiner* — Son T Nguyen
(74) *Attorney, Agent, or Firm* — John G. Fischer, Esq.; Scheef & Stone, L.L.P.

(57) ABSTRACT

The present invention discloses a collapsible metal planter. The planter has a plurality of wall sections. Each wall section side portion has a first end portion and an opposing second end portion. The end portions are angularly disposed inwards. Each first end portion has a first edge with a V-shaped notch positioned in vertical orientation. Each second end portion has a second edge with a V-shaped notch positioned in vertical orientation opposite to that of the first edge notch. The first edge notch and second edge notch form a square orifice when the first end portion of a wall section is placed in abutment with the second end portion of an adjacent wall section. The square orifice is receivable of a fastener to secure the adjacent wall sections together.

20 Claims, 11 Drawing Sheets

(56) References Cited

U.S. PATENT DOCUMENTS

| | | | | |
|---|---|---|---|---|
| 2,140,996 A | * | 12/1938 | Heifetz | B65D 3/28 |
| | | | | 47/66.2 |
| 2,774,187 A | | 12/1956 | Smithers | |
| 3,000,531 A | * | 9/1961 | Joswig | B21D 51/00 |
| | | | | 220/4.16 |
| 3,570,801 A | * | 3/1971 | Moritz | B28B 7/0014 |
| | | | | 249/DIG. 4 |
| 3,696,960 A | * | 10/1972 | Smirle | B65D 25/02 |
| | | | | 220/DIG. 25 |
| 4,013,168 A | | 3/1977 | Bamburg et al. | |
| 4,116,510 A | * | 9/1978 | Franco | H05K 5/0008 |
| | | | | 411/378 |
| D303,231 S | | 9/1989 | Mottmiller et al. | |
| D322,769 S | | 12/1991 | Gingras et al. | |
| 5,419,529 A | * | 5/1995 | Welch | F16M 5/00 |
| | | | | 249/149 |
| 5,573,175 A | | 11/1996 | Straub et al. | |
| 5,772,108 A | | 6/1998 | Ruggiere, Sr. et al. | |
| D407,534 S | | 3/1999 | Howard et al. | |
| 6,074,331 A | | 6/2000 | Ruggiere, Sr. et al. | |
| D430,372 S | | 8/2000 | Howard et al. | |
| D450,413 S | | 11/2001 | Howard et al. | |
| 6,364,200 B1 | | 4/2002 | Moss et al. | |
| 6,371,363 B1 | | 4/2002 | Franklin et al. | |
| 6,386,437 B1 | | 5/2002 | Larson, Jr. | |
| 6,588,651 B2 | | 7/2003 | Quaintance | |
| 6,688,514 B2 | | 2/2004 | Evans et al. | |
| 6,783,058 B2 | | 8/2004 | Quaintance | |
| 6,789,916 B2 | | 9/2004 | Ruggles | |
| 7,681,781 B2 | | 3/2010 | Wisecarver | |
| 7,909,189 B2 | | 3/2011 | Ours et al. | |
| D653,162 S | | 1/2012 | Moore et al. | |
| 8,690,048 B2 | | 4/2014 | Philips et al. | |
| D725,315 S | | 3/2015 | Gabriel | |
| 8,998,070 B2 | | 4/2015 | Wisecarver | |
| D734,688 S | | 7/2015 | DeYoung et al. | |
| 9,185,853 B1 | | 11/2015 | Ascherman et al. | |
| 9,694,934 B2 | | 7/2017 | Olds et al. | |
| 10,273,070 B2 | | 4/2019 | Perkins et al. | |
| D848,700 S | | 5/2019 | Busch | |
| 2003/0160092 A1 | | 8/2003 | Philips et al. | |
| 2009/0071956 A1 | * | 3/2009 | Lin | B65F 1/02 |
| | | | | 220/4.31 |
| 2013/0264338 A1 | * | 10/2013 | Dunstan | B23P 19/00 |
| | | | | 29/525.01 |
| 2014/0055018 A1 | * | 2/2014 | Shein | A01G 9/02 |
| | | | | 312/265.5 |
| 2017/0174390 A1 | * | 6/2017 | Clark | E05B 35/00 |

FOREIGN PATENT DOCUMENTS

| | | | | |
|---|---|---|---|---|
| CN | 107792464 A | * | 3/2018 | |
| DE | 29916580 U1 | * | 12/1999 | B65D 7/30 |
| KR | 20120106481 A | * | 9/2012 | |
| WO | WO-0185555 A1 | * | 11/2001 | B65D 1/225 |
| WO | WO-0202883 A1 | * | 1/2002 | B65D 11/1873 |
| WO | WO-03018412 A1 | * | 3/2003 | B65D 19/12 |

\* cited by examiner

METAL PLANTER ASSEMBLY

TECHNICAL FIELD OF INVENTION

The embodiments of the disclosed invention relate to a new metal planter assembly. In particular, the disclosed invention is applicable for efficient packaging, storage, shipping, and retail display of metal planters.

BACKGROUND OF THE INVENTION

Metal planters have recently gained popularity for residential and commercial use. They provide an unbreakable vessel with a strong appearance, and they can be painted or powder-coated to suit to architectural application. Metal planters have further benefits in that they do not crack or wear over time, and are resistant to pest attack and weather extremes. They can be made of stainless steel, COR-TEN® steel, or aluminum, depending on the appearance and weight preferences in the intended use.

Metal planters are typically welded such that they are difficult and expensive to package, store, ship, or display in retail stores. They are also difficult to transport up stairways in multi-family home environments.

Collapsible metal planters are available as an alternative. An example is provided by Nice Planter LLC, which can be seen at niceplanter.com. These products typically include sliding panels for assembly that, once fit together, require threaded fasteners to secure the side panels in place. In other versions of this planter, separate edge pieces and spanners are included for assembly.

One disadvantage with these planters is that for the walls to be formed, metal panels are bent in metal bending operations, and that limits the thickness to relatively thin-walled material. Another disadvantage is that the thin walls can be easily damaged in transport and become difficult to slide together for assembly. Another disadvantage with these planters is that the more pieces required for assembly, the more difficult the assembly. Another problem with these planters is that the more pieces required for assembly, the more difficult, costly, and error prone the product is to inventory, package and ship.

Another disadvantage with these planters is that the walls may be pre-threaded. Besides requiring separate threading of bolts and secondary threading of the fastener connectors such as threaded nuts, bent walls will exacerbate the assembly process. Another disadvantage with these designs is that a thin walled planter may not provide the stability and strength in appearance desired. Another disadvantage with these designs is that they may not provide sufficient weight to support the intended planting in an outdoor environment where the wind may turn a taller planting over. Another disadvantage with these designs is that they are much easier to assemble with two persons.

There remains a need for a collapsible metal planter that can be provided with thicker walls. There also remains a need for a collapsible metal planter that minimizes the number of pieces required to be inventoried, packaged, shipped, and then assembled by the end user. There remains a need for a collapsible metal planter that is resistant to shipping damage. There remains a need for a collapsible metal planter that provides sufficient weight to support taller plantings in outdoor environments. There remains a need for a collapsible metal planter that one person can assemble.

In summary, the preferred embodiments of the present invention provide a unique solution to the engineering constraints and challenges of providing a collapsible metal planter that overcomes the aforementioned disadvantages.

SUMMARY OF THE INVENTION

The present invention provides a substantially improved collapsible metal container such as for use as a planter. In particular, the disclosed invention provides a collapsible metal planter that can be provided with thicker walls. The disclosed collapsible metal planter further minimizes the number of pieces required to be inventoried, packaged, shipped, and then assembled by the end user. The disclosed collapsible metal planter further is resistant to shipping damage. The disclosed collapsible metal planter further provides sufficient weight to support taller plantings in outdoor environments. The disclosed collapsible metal planter further provides a self-alignment of side portions to form openings for fasteners when aligned, and resists collapsing during assembly, even before coupling the fastener to a fastener connector, such as a threaded nut or threaded wingnut.

A new collapsible metal planter is disclosed. The planter has a plurality of wall sections. Each wall section has a side portion having an inside, an outside, and a first end portion and opposing second end portion. The end portions are angularly disposed towards the inside of the side portion.

Each first end portion has a first edge with a V-shaped notch positioned in vertical orientation. Each second end portion has a second edge with a V-shaped notch positioned in vertical orientation opposite to that of the first edge notch. The first edge notch and second edge notch form a square orifice when the first end portion of a wall section is placed in abutment with the second end portion of an adjacent wall section. The square orifice is receivable of a fastener to secure the adjacent wall sections together.

In another embodiment, the V-shaped notches have a vertex angle of 90 degrees. In another embodiment, the V-shaped notch of the first end portion is orientated substantially 180 degrees opposite to the V-shaped notch of the second end portion to which it aligns when adjacent wall sections are placed in abutment.

In another embodiment, the first edge has a plurality of first edge notches. Each first edge notch is reversed in vertical orientation as compared to any first edge notch above or below it. The second edge has a plurality of second edge notches. Each second edge notch is reversed in vertical orientation as compared to any second edge notch above or below it.

In another embodiment, the end portions are angularly disposed at 120 degrees to the inside of the side portion. In another embodiment, the end portions are angularly disposed at 135 degrees to the inside of the side portion.

In another embodiment, the end portions are angularly disposed at 144 degrees to the inside of the side portion. In another embodiment, the end portions are angularly disposed at 150 degrees to the inside of the side portion.

In another embodiment, the fastener has a square shoulder for insertion into the square orifice. In another embodiment, a relief is formed on a lower end of each side portion. In another embodiment, the end portions extend below the side portion to form legs on the bottom of the end portions.

In another embodiment, a base tab is formed on the inside of the side portion of a pair of opposing walls. A base is provided, having base sides and base edges between the base sides. The base is positionable on the base tabs between the walls.

In another embodiment, a base is provided, having base sides and base edges between the base sides. The base is positionable between the wall sections where it rests on the base tabs.

In another embodiment, each first end portion has an edge with a tab extending from it. Each second end portion has an edge with a slot. The slot of the second end portion provides complementary engagement with the tab of the first end portion of an adjacent wall section.

A V-shaped notch is located at the top and bottom of the tab. A complementary V-shaped notch is located in reverse orientation at the top and bottom of the slot. The notches form a square orifice when the first end portion of one wall section is placed in abutment with the second end portion of an adjacent wall section. A fastener is locatable in the square orifice to secure the adjacent wall sections together.

In another embodiment, each first end portion has a first edge with a tab extending from it and a slot formed on it. Each second end portion has a second edge with a tab extending from it and a slot formed on it. The tab and slot of the first end portion engage with the slot and tab of the second end portion of an adjacent wall section when the first end portion of the wall section is placed in abutment with the second end portion of the adjacent wall section.

In another embodiment, additional walls can be added with corresponding changes in the angularity of the end portions to the side portions to create containers in the shape of convex polygons having more sides. As will be understood by one of ordinary skill in the art, the assembly disclosed may be modified and the same advantageous result obtained.

BRIEF DESCRIPTION OF THE DRAWINGS

FIG. 2 is a close-up of view of the end portions of adjacent wall sections prior to assembly.

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
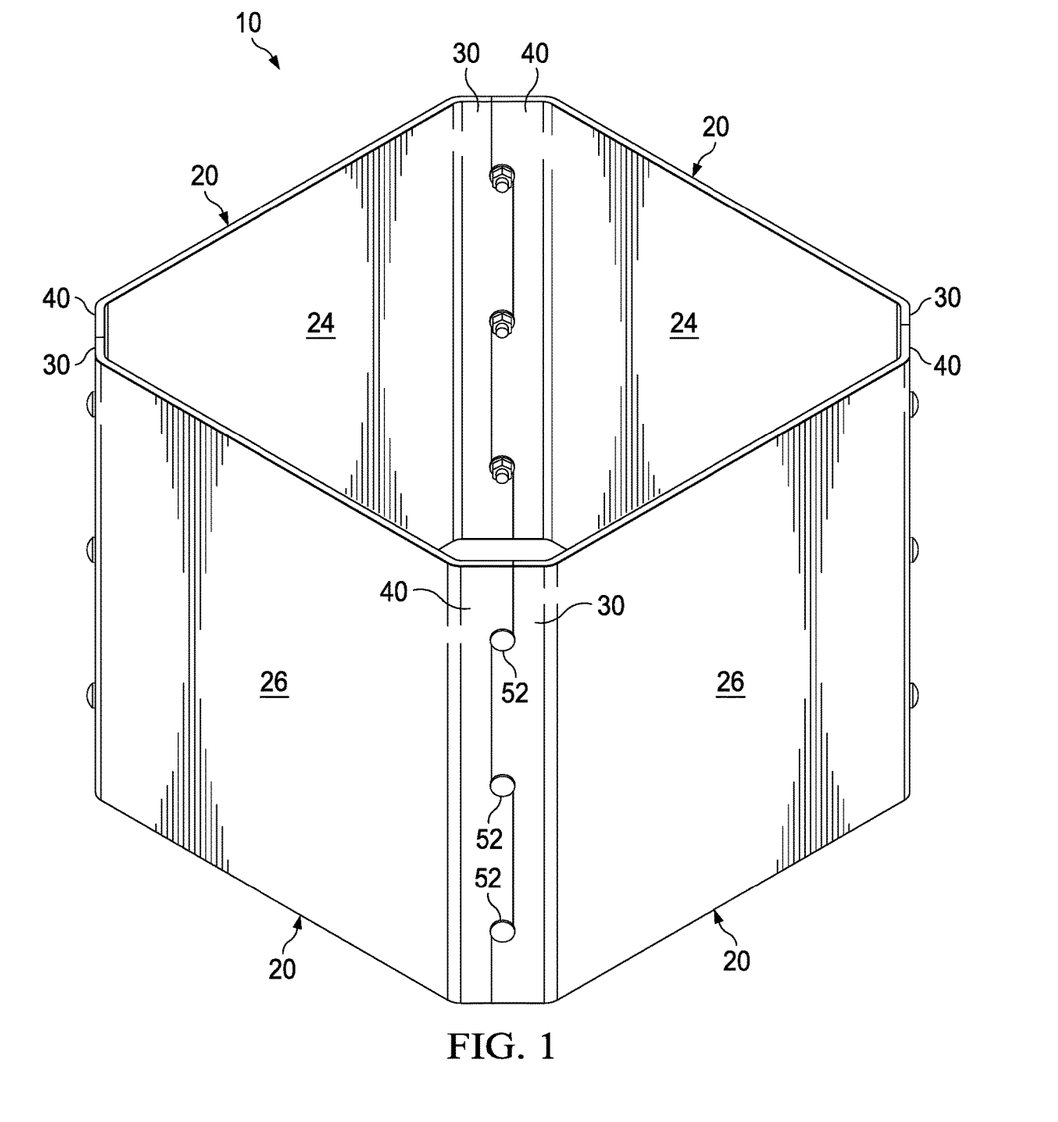
FIG. 1 is an isometric view of a first embodiment of the metal container assembly of the present invention.

FIG. 1 is an isometric view of a first embodiment of metal container 10 of the present invention. In the embodiment of FIG. 1, metal container 10 is comprised of four walls 20. Walls 20 have a first end portion 30 and a second end portion 40 located on opposite ends of each wall 20. First end portion 30 on each wall 20 is placed in abutment with second end portion 40 of an adjacent wall 20. Fasteners 52 connect each first end portion 30 to second end portion 40 of an adjacent wall 20 to form metal container 10. It will be understood by one of ordinary skill in the art that the number of walls 20 may be any number greater than three, but as a practical matter, assembly becomes extensive when there are greater than eight walls 20.

Figure 2:
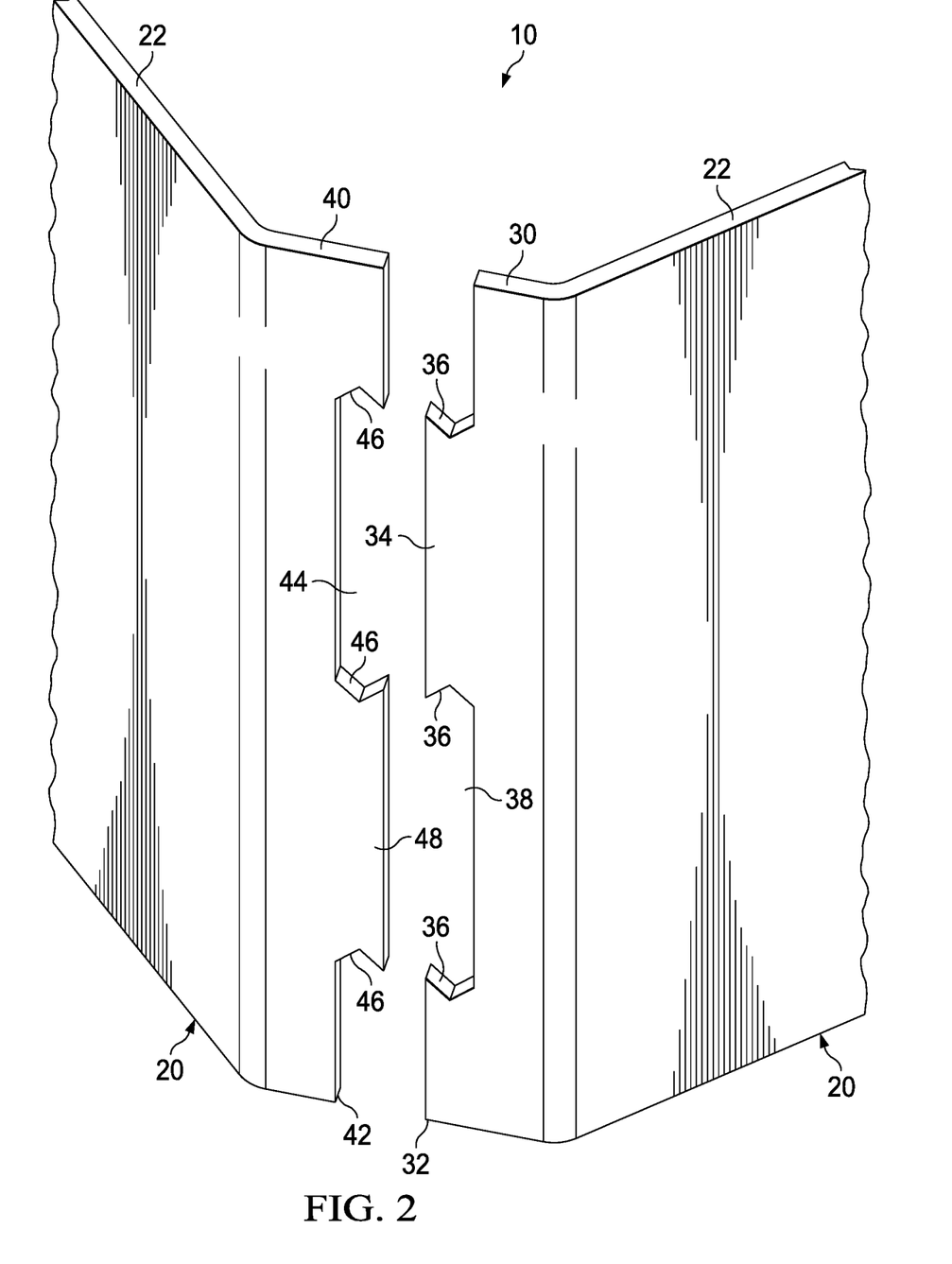
FIG. 2 is an isometric exploded view of the embodiment of the metal container assembly of FIG. 1.

FIG. 2 is a partial isometric exploded view of the embodiment of metal container 10 of FIG. 1. Metal container 10 is comprised of four walls 20 in the illustrated embodiment. As best seen in this view, walls 20 have a side portion 22. Side portions 22 have an inside 24 and an opposite outside 26. First end portion 30 and second end portion 40 are located on opposite ends of each side portion 22 of each wall 20.

First end portion 30 has a first edge 32 with a V-shaped notch 36 positioned in vertical orientation. Second end portion 40 has a second edge 42 with a V-shaped notch 46 positioned in vertical orientation opposite to that of first edge 32 notch 36. First edge 32 notch 36 and second edge 42 notch 46 form a square orifice 50 when first end portion 30 of a wall section 20 is placed in abutment with second end portion 40 of an adjacent wall section 20. Square orifice 50 is receivable of a fastener 52 (see FIG. 4) to secure adjacent wall sections 20 together.

In the embodiment illustrated, V-shaped notches 36 and 46 have a vertex angle of 90 degrees. As shown in FIG. 2, V-shaped notch 36 of first end portion 30 is orientated substantially 180 degrees opposite to V-shaped notch 46 of second end portion 40 to which it aligns when adjacent wall sections 20 are placed in abutment.

In another embodiment, first edge 32 has a plurality of first edge notches 36. Each first edge 32 notch 36 is reversed in vertical orientation as compared to any first edge 32 notch 36 immediately above it or below it. Second edge 42 has a plurality of second edge notches 46. Each second edge 42 notch 46 is reversed in vertical orientation as compared to any second edge 42 notch 46 immediately above or below it.

In the embodiment illustrated, first end portion 30 has a traversing first edge 32 with a tab 34 extending from it. Second end portion 40 has a traversing second edge 42 with a slot 44 thereon for complementary engagement with tab 34 of first end portion 30 of an adjacent wall section 20 when the first end portion 30 of adjacent wall section 20 is placed in abutment with second end portion 40. This is best seen in FIG. 3.

Referring again to FIG. 2, tab 34 of first end portion 30 has a 90 degree V-shaped notch 36 located at the top and bottom of tab 34. Slot 44 of second end portion 40 has a 90 degree V-shaped notch 46 at the top and bottom of slot 44. Notch 36 and notch 46 are in vertically opposite orientation, such that if one is right side up, the other is upside down.

Figure 3:
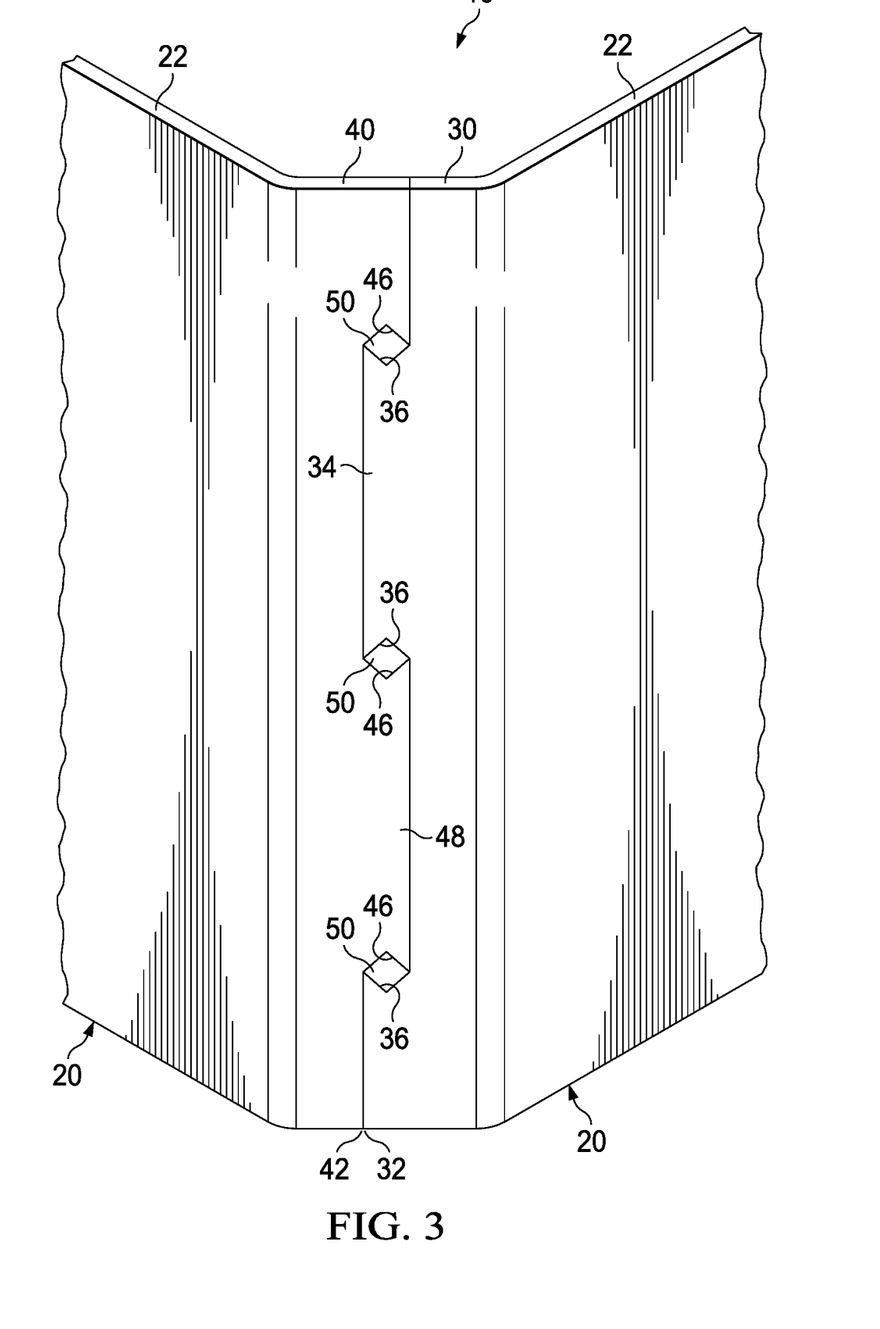
FIG. 3 is a close-up view of the end portions of adjacent wall sections of FIG. 2, illustrating the wall sections in abutment prior to receiving fasteners.

FIG. 3 is a close-up view of end portions 30 and 40 of adjacent walls 20 of FIG. 2, illustrating first end portion 30 and second end portion 40 in complementary abutment prior to receiving fasteners 52. As best seen in this view, notch 36 and notch 46 form a square orifice 50 when the first end portion 30 of adjacent wall 20 is placed in abutment with second end portion 40.

Referring back to FIG. 2, in the embodiment illustrated, a third V-shaped slot 36 is formed on first edge 32 directly below tab 34. This forms a slot 38 on first edge 32. Also shown in FIG. 2, a third V-shaped slot 46 is formed on second edge 42. This forms a tab 48 on second edge 42. As shown in this embodiment, the number of square orifices 50 provided can be increased by adding V-shaped notches 36 along first edge 32 in successively reversed orientation, and matching the slots 36 with complementary V-shaped notches 46 on second edge 42, also in successively reversed orientation. Therefore, each V-shaped slot 36 or 46 is reversed in orientation as compared to each V-shaped slot above and below it, and as to the V-shaped slot (36, 46) it is aligned with it on the opposing first and second end portions (30, 40).

A fastener 52 is locatable in square orifice 50 to secure adjacent walls 20 together. Abutment of first end portion 30 of a first wall section 20 with second end portion 40 of an adjacent wall 20 requires horizontal positioning of tab 34 with slot 44.

Due to the opposing orientation of V-shaped notch 36 to V-shaped notch 46, insertion of fastener 52 into square orifice 50 prevents horizontal separation of adjacent walls 20. In a preferred embodiment, fastener 52 has a square (cubic) shoulder that is insertable into square orifice 50. The square shoulder feature of fastener 52 prevents rotation of fastener 52 and permits easy, one-handed connection of a threaded coupling of fastener 52, such as are shown on the interior of metal container 10 in FIG. 1.

First end portion 30 on each wall 20 is placed in abutment with the second end portion 40 of an adjacent wall 20. Fasteners 52 connect each first end portion 30 to the second end portion 40 of the adjacent wall 20 to form metal container 10.

Figure 4:
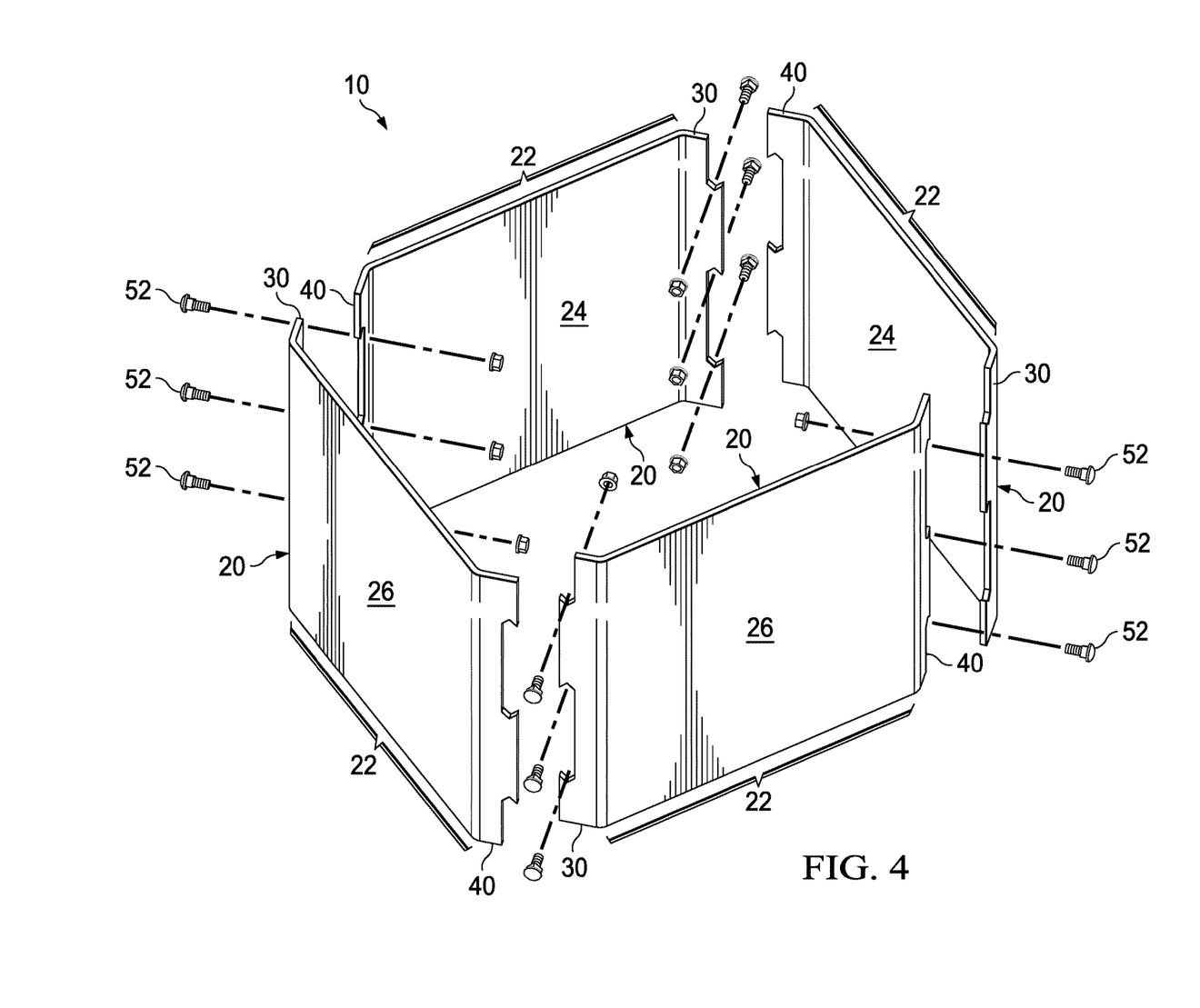
FIG. 4 is an isometric exploded view of the embodiment of the metal container assembly of FIG. 1.

FIG. 4 is an isometric exploded view of the embodiment of the metal container assembly of FIG. 1. In this view it is seen that walls 20 are identical in shape, and they are substantially flat. This provides the several significant advantages of manufacturing efficiency, and nesting capability for storage, packaging and shipping. It is further seen that provision of complementary fitting first end portion 30 and second end portion 40 provides both an aesthetically more interesting metal container 10 over a simple square box design, but the design facilitates an assembly that creates natural orifices 50 that receive fasteners 52 without the need to overlap components or to provide gussets, braces, or other components.

In the embodiment illustrated, only four walls 20 and fasteners 52 are needed, and nothing else is required. As described above, abutment of first end portion 30 of a first wall section 20 with second end portion 40 of an adjacent wall section 20 requires horizontal positioning of tab 34 with slot 44. When fasteners 52 are inserted into square orifices 50, adjacent walls 20 resist separation, allowing the assemblyman to complete the task of securing complementary fastener connectors 54 to fasteners 52.

Figure 5:
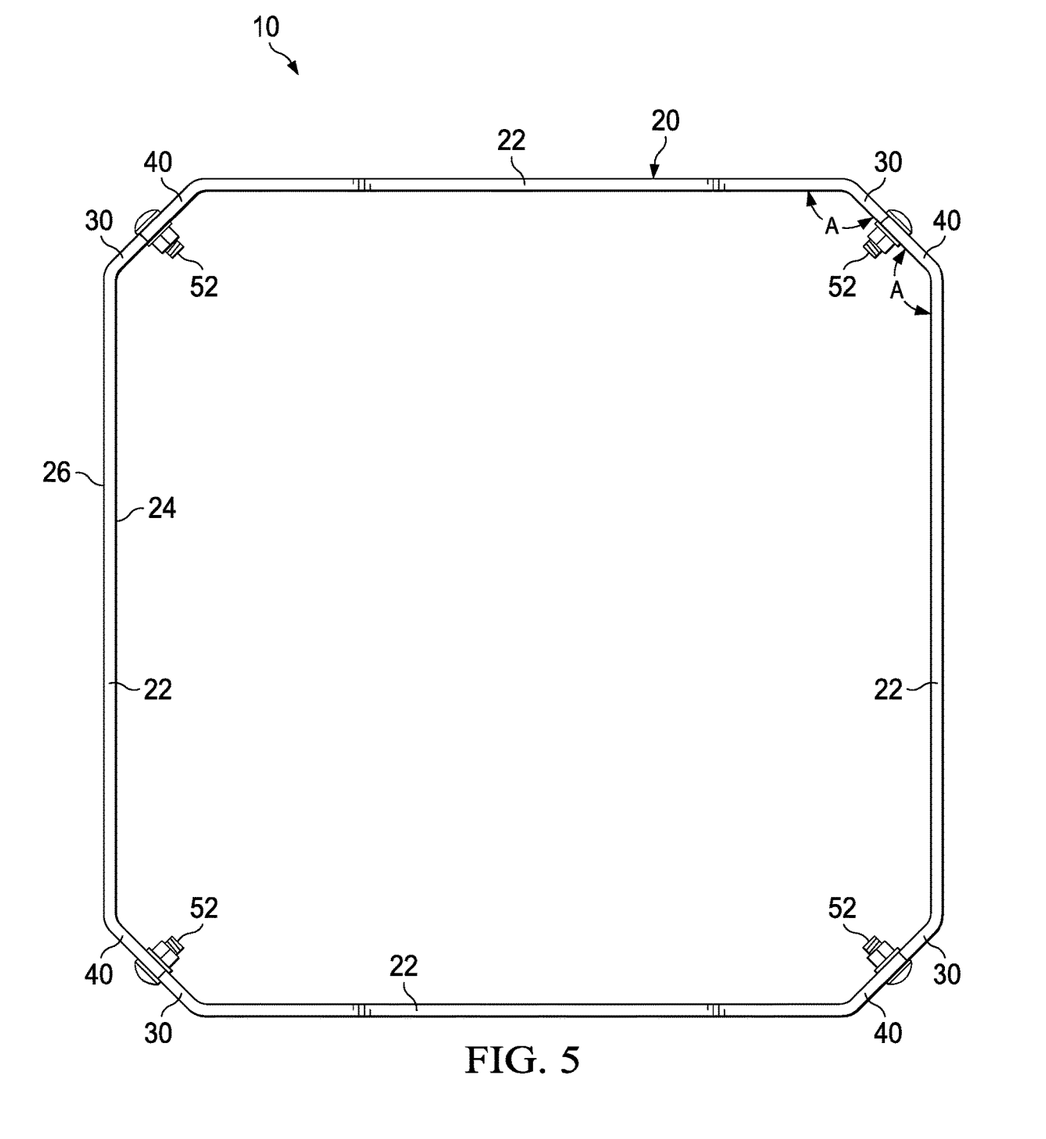
FIG. 5 is a top view of the embodiment of the metal container assembly of FIG. 1.

FIG. 5 is a top view of the embodiment of metal container 10 illustrated in FIGS. 1-4. First end portion 30 and second end portion 40 are angularly disposed towards inside 24 of side portion 22. First end portion 30 and second end portion 40 can be advantageously formed by conventional forming methods, such as bending. The embodiment shown has four wall sections, each with a first end portion 30 and second end portion 40 that is angularly disposed at angle A, which is 135 degrees towards inside 24 of side portion 22.

Metal container 10 can have three or more walls 20, so long as end portions 30 and 40 of adjacent walls 20 are in abutment for assembly. For example, a triangular metal container 10 embodiment has three walls 20, but also has three combined first and second end portions (30 and 40) to become a hexagon, in which first end portion 30 and second end portion 40 are angularly disposed at 120 degrees towards inside 24 of side portion 22.

A pentagon shaped metal container 10 has five walls 20, but also has five combined first and second end portions (30 and 40) to become a decagon, in which first end portion 30 and second end portion 40 are angularly disposed at 144 degrees towards inside 24 of side portion 22. A hexagon shaped container has six walls, but also has six combined first and second end portions (30 and 40) to become a dodecagon, in which first end portion 30 and second end portion 40 are angularly disposed at 144 degrees towards inside 24 of side portion 22.

It will be understood by one of ordinary skill in the art that the number of walls 20 may be any number greater than three, but as a practical matter, assembly labor increases with more walls.

Figure 6:
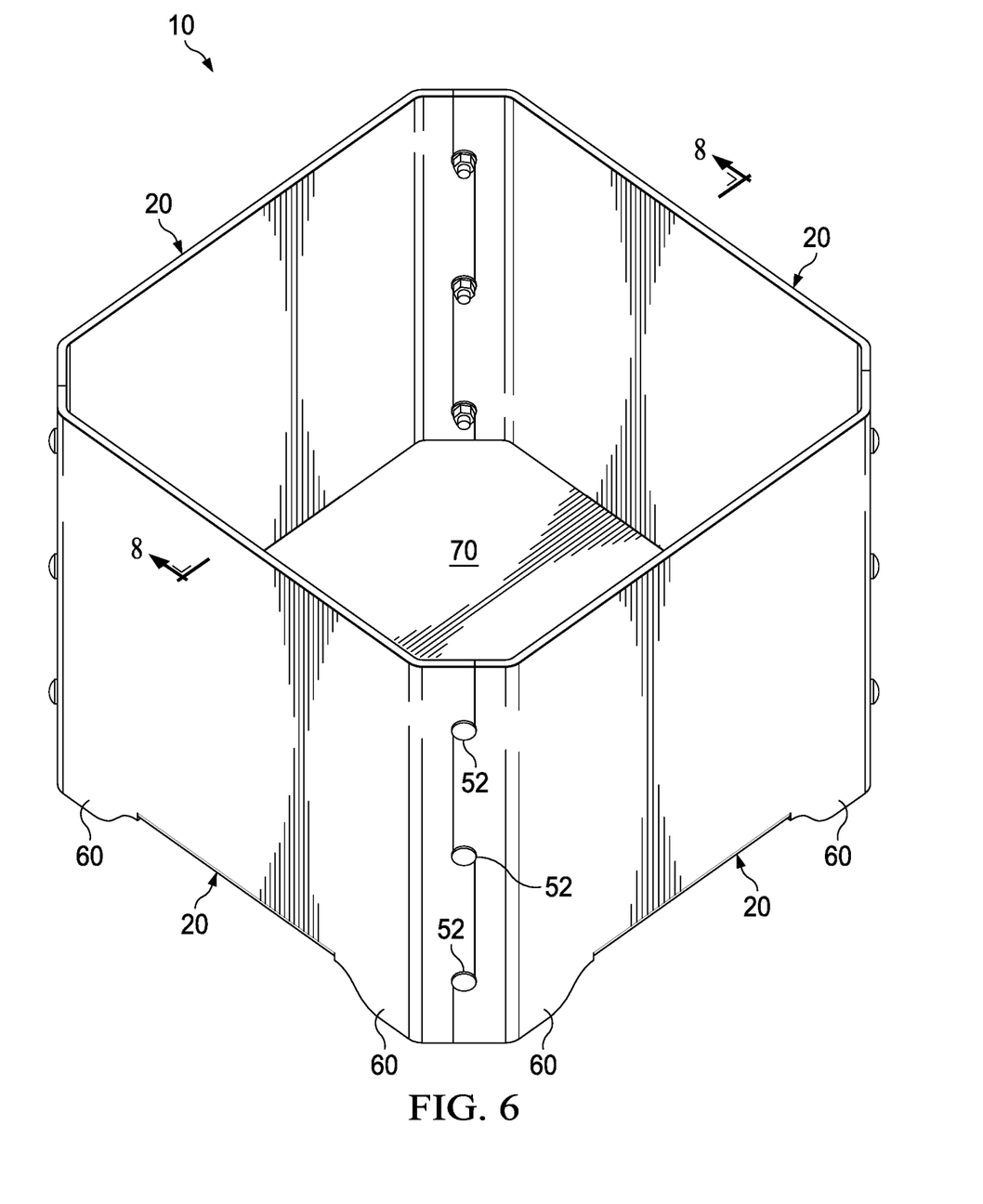
FIG. 6 is an isometric view of a second embodiment of the metal container assembly of the present invention.

FIG. 6 is an isometric view of a second embodiment of metal container 10 of the present invention. In this embodiment, a base 70 is provided. Also in this embodiment, legs 60 may be provided to raise metal planter 10 up so that base 70 is not resting on the ground, and thus facilitating water drainage from metal container 10.

Figure 7:
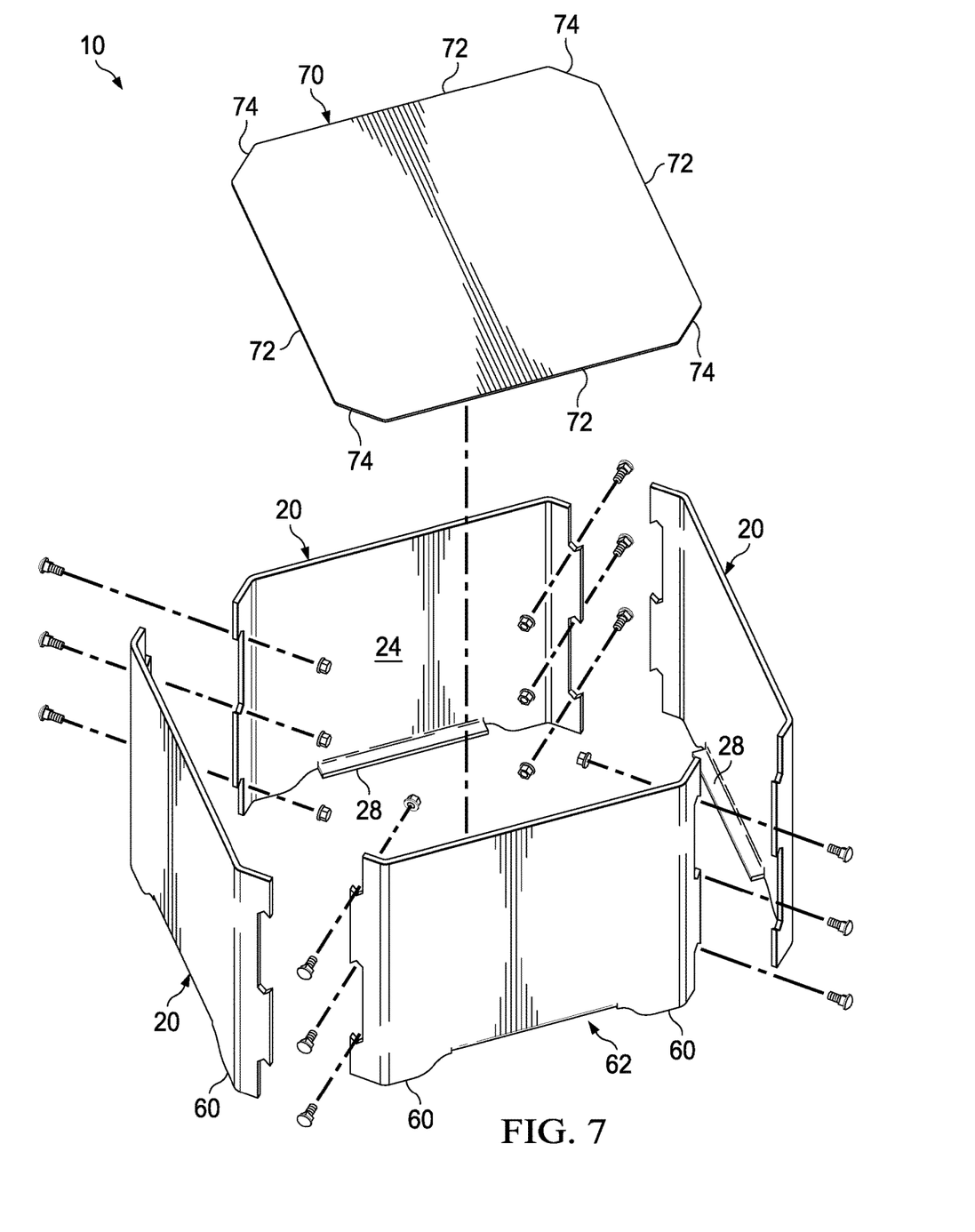
FIG. 7 is an isometric exploded view of the second embodiment of the metal container assembly of FIG. 6.

FIG. 7 is an isometric exploded view of the second embodiment of metal container 10 illustrated in FIG. 6. As seen in FIG. 7, base 70 may include base sides 72 connected by base edges 74. Base edges 74 extend base 70 to the inside of combined first end portions 30 and second end portions 40. A relief 62 defines the space between legs 60. Relief 62 may be created, in whole or in part, by forming a base tab 28 that extends from the bottom of side portion 22 that extends inward to support base 70. Base tabs 28 may be formed by conventional manufacturing methods for working with steel plate, including forming, bending or welding.

Figure 8:
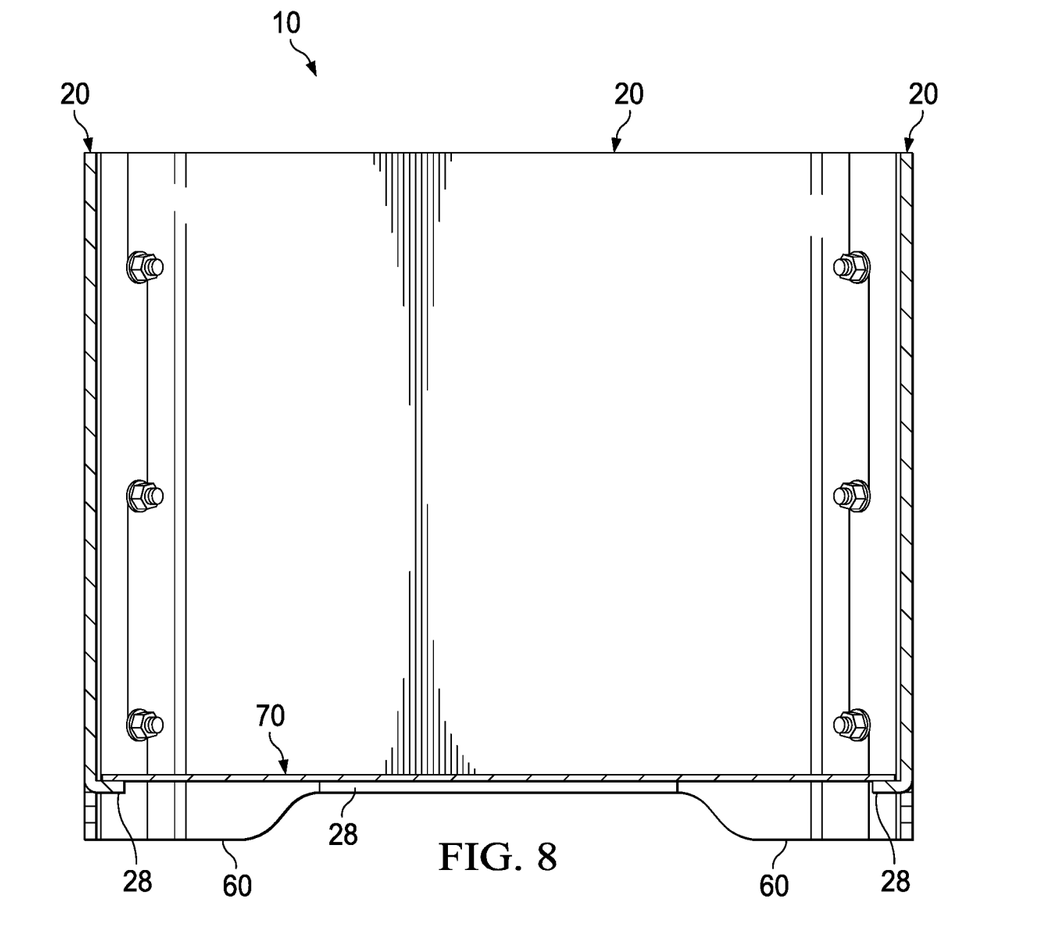
FIG. 8 is a side section view of the embodiment of the metal container assembly of FIG. 6.

FIG. 8 is a cross-sectional view of the embodiment of metal container 10 of FIGS. 6 and 7, illustrating the Section indicated in FIG. 6. In this view, base 70 is shown resting on base tabs 28.

Figure 9:
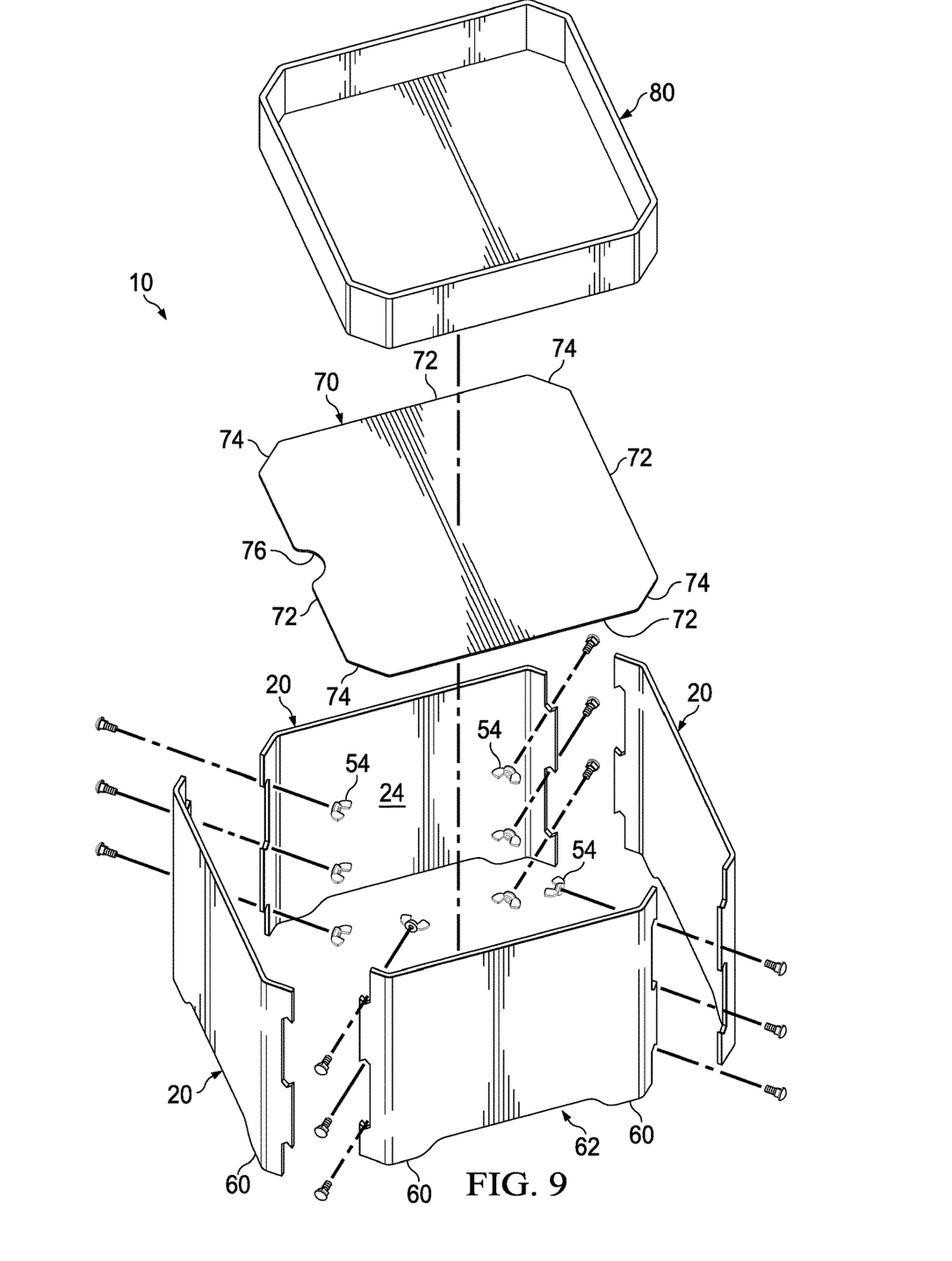
FIG. 9 is an isometric exploded view of a third embodiment of the metal container assembly.

FIG. 9 is an isometric exploded view of a third embodiment of metal container 10. In this view, side portions 22 have no base tabs 28. Instead, base 70 will rest on fastener connectors 54. In this embodiment, manufacturing costs are reduced by eliminating the requirement to form based tabs 28 on side portions 22 to support base 70. An optional recess 76 is provided to permit finger insertion to facilitate assembly. Also, in this embodiment, there is an optional plastic planter box 80 disclosed that may be supported on base 70 for containing soil and pre-planted vegetation. Plastic planter box 80 can also be used in the other embodiments disclosed herein, although it has particular usefulness in this embodiment where shallower soil environments may be desired.

Figure 10:
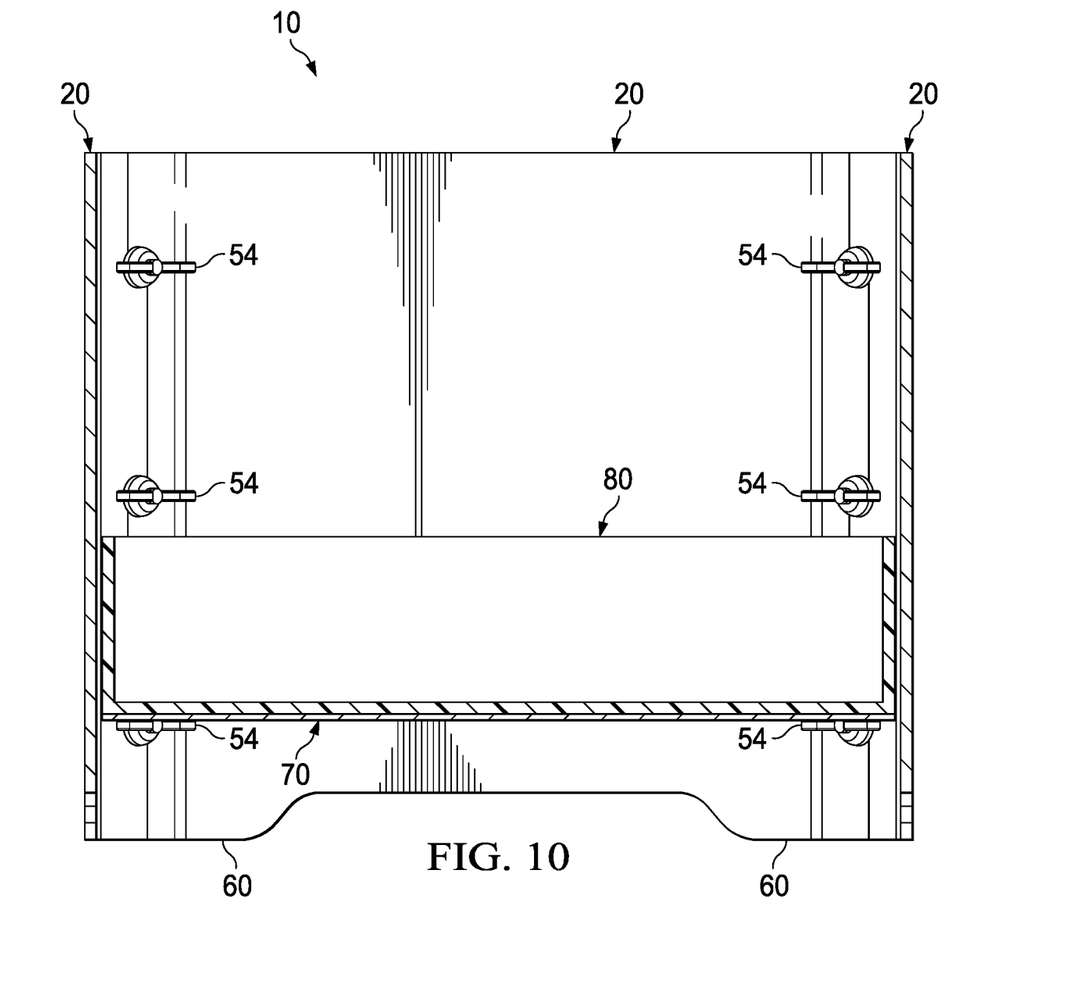
FIG. 10 is a cross-sectional view of the embodiment of the metal container assembly illustrated in FIG. 9.

FIG. 10 is a cross-sectional view of the embodiment of metal container 10 of FIG. 9. In this view, base 70 is shown resting on fastener connectors 54, which are wingnuts in this illustration. As seen in this view, base 70 may be positioned on the top row of fastener connectors 54, the middle row of fastener connectors 54, or the bottom row of fastener connectors 54. By so selecting, a broader variety of vegetation can be supported within metal container 10.

Figure 11:
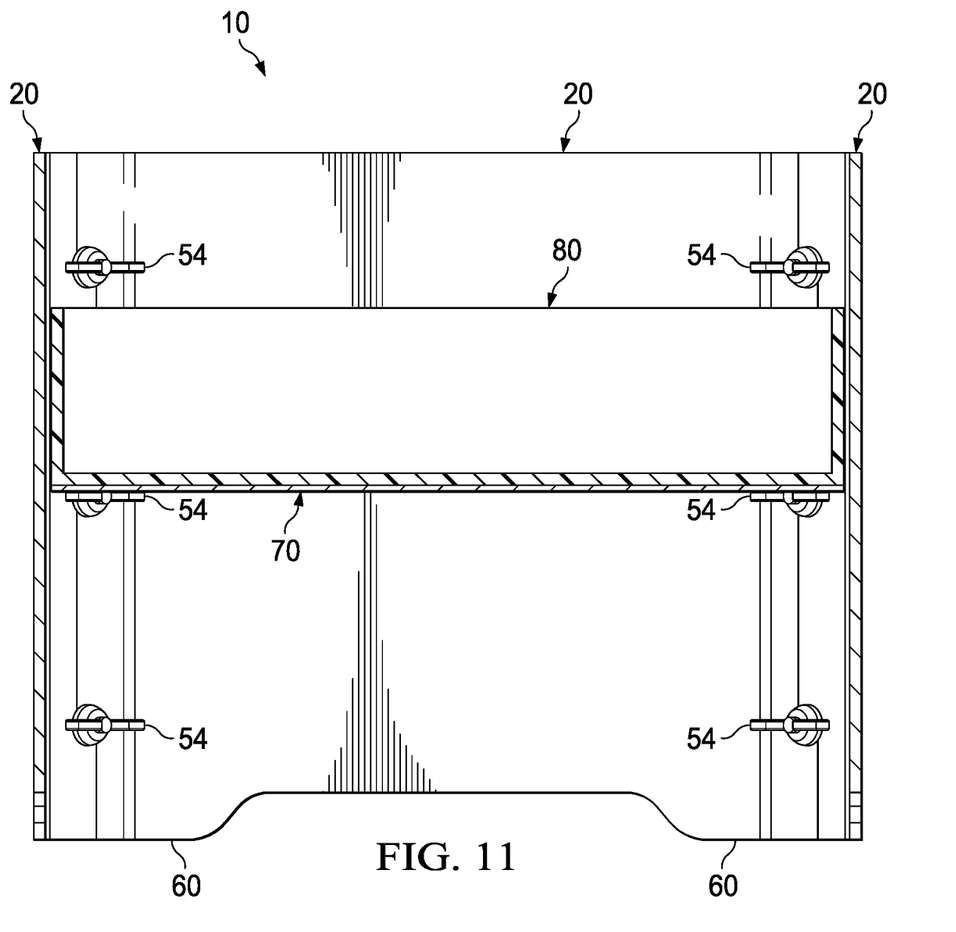
FIG. 11 is a cross-sectional view of the embodiment of the metal container assembly of FIG. 9, illustrated with the base located in an elevated position.

FIG. 11 is a cross-sectional view of the embodiment of metal container 10 of FIG. 9, illustrated with base 70 located in an elevated position. As illustrated in this view, base 70 may be positioned on the middle row of fastener connectors 54. Plastic planter box 80 is supported on base 70. This permits locating a preassembled arrangement of vegetation in metal container 10. It also provides moisture control particularly when watering in shallower soil environments that are available in this embodiment.

In an alternative embodiment, not illustrated, the V-shaped notches 36, 46 are semicircular, and have their diameters positioned along the horizontal. The semicircular notches are provided in reversing orientation along the horizontal axis and together form a circular orifice that is receivable of a cylindrical fastener 52.

As illustrated, the invention provides a unique solution to the engineering constraints and challenges of providing a collapsible metal container 10 such as for use as a planter. In particular, the disclosed invention provides a collapsible metal planter 10 that can be provided with thicker walls 20, and that minimizes the number of pieces required to be inventoried, packaged, shipped, and then assembled by the end user. Disclosed collapsible metal container 10 further is resistant to shipping damage. Disclosed collapsible metal container 10 further provides sufficient weight to support taller plantings in outdoor environments. Disclosed collapsible metal container 10 further provides a self-alignment of side portions to form openings for fasteners 52 when aligned, and resists collapsing during assembly, even before coupling fastener 52 to its fastener connector 54, such as a threaded nut or threaded wingnut.

As used herein, the term "substantially" is intended for construction as meaning "more so than not."

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A metal planter assembly, comprising:
   a plurality of identical wall sections, each wall section comprising:
      a planar side portion, having an inside and an outside;
      a planar first end portion and a planar second end portion extending from opposite ends of the side portion; and,
      the end portions being angularly disposed towards the inside of the side portion;
   each first end portion having a first edge;
   each second end portion having a second edge;
   a first V-shaped notch located on the first edge of the first end portion;
   a second V-shaped notch located vertically beneath, in vertically reversed orientation, to the first V-shaped notch;
   the first edge extending vertically between an outermost end of the first V-shaped notch and an outermost end of the second V-shaped notch to form a tab on the first end portion;
   a third V-shaped notch located on the second edge, and in vertically reversed orientation, to the first V-shaped notch;
   a fourth V-shaped notch located vertically beneath, in vertically reversed orientation, to the third V-shaped notch;
   the second edge extending vertically between an innermost end of the third V-shaped notch and an innermost end of the fourth V-shaped notch to form a slot on the first end portion;
   the first and third V-shaped notches forming a first square orifice and the second and fourth V-shaped notches forming a second square orifice when the first end portion of the adjacent wall section is placed in coplanar abutment with the second end portion; and,
   the first and second square orifices receivable of a fastener to secure the adjacent wall sections together.

2. The metal planter assembly of claim 1, further comprising: the first, second, third, and fourth V-shaped notches having a vertex angle of 90 degrees.

3. The metal planter assembly of claim 1, further comprising:
   the end portions being angularly disposed at 120 degrees to the inside of the side portion.

4. The metal planter assembly of claim 1, further comprising:
   the end portions being angularly disposed at 135 degrees to the inside of the side portion.

5. The metal planter assembly of claim 1, further comprising:
   the end portions being angularly disposed at 144 degrees to the inside of the side portion.

6. The metal planter assembly of claim 1, further comprising:
   the end portions being angularly disposed at 150 degrees to the inside of the side portion.

7. The metal planter assembly of claim 1, further comprising:
   the square orifice is receivable of a fastener having a square shoulder; and,
   wherein the square shoulder of the fastener engages the square orifice to prevent rotation of the fastener.

8. The metal planter assembly of claim 1, further comprising:
   a relief formed on a lower end of each side portion.

9. The metal planter assembly of claim 8, further comprising: legs formed on the end portions and the side portions between the reliefs.

10. The metal planter assembly of claim 1, further comprising:
   a base tab formed on the inside of each side portion of a pair of opposing walls;
   a base comprising base sides and base edges between the base sides; and,
   wherein the base is positionable on the base tabs.

11. The metal planter assembly of claim 10, further comprising:
the base having a recess along its periphery; and,
the recess permitting insertion of a person's finger between the base and a side portion.

12. The metal planter assembly of claim 10, further comprising:
a rectilinear planter box locatable between the side portions and on top of the base for supporting soil and vegetation.

13. The metal planter assembly of claim 1, further comprising:
the fastener having a complementary fastener connector;
the fastener connector being a wingnut; and,
a base supportable on top of the fastener connector.

14. The metal planter assembly of claim 1, the tab further comprising: the first V-shaped notch having a vertex angle that is pointed vertically downwards; and, the second V-Shaped notch having a vertex angle that is pointed vertically upwards.

15. The metal planter assembly of claim 1, the slot further comprising: the third V-Shaped notch having a vertex angle that is pointed vertically upwards; and, the fourth V-Shaped notch having a vertex angle that is pointed vertically downwards.

16. The metal planter assembly of claim 1, further comprising:
the square orifice is receivable of a fastener having a square shoulder; and,
wherein the square shoulder of the fastener engages the square orifice to prevent rotation of the fastener.

17. The metal planter assembly of claim 1, further comprising:
the end portions being angularly disposed towards the inside of the side portion at an angle greater than 90 degrees.

18. The metal planter assembly of claim 1, wherein the metal planter assembly is a non-rectangular structure.

19. The metal planter assembly of claim 1, further comprising:
the first edge extending vertically upward from an innermost end of the first V-shaped notch;
the first edge extending vertically downward from an innermost end of the second V-shaped notch;
the second edge extending vertically upward from an outermost end of the third V-shaped notch; and,
the second edge extending vertically downward from an outermost end of the fourth V-shaped notch.

20. The metal planter assembly of claim 1, further comprising:
the tab of the first end portion engaging with the slot of the second end portion of an adjacent wall section when the first end portion of the wall section is placed in coplanar abutment with the second end portion of the adjacent wall section to form an additional rectilinear side of the planter assembly.

* * * * *

UNITED STATES PATENT AND TRADEMARK OFFICE
CERTIFICATE OF CORRECTION

| | | |
|---|---|---|
| PATENT NO. | : 12,219,908 B2 | Page 1 of 1 |
| APPLICATION NO. | : 17/003165 | |
| DATED | : February 11, 2025 | |
| INVENTOR(S) | : Robert Glen Allen | |

It is certified that error appears in the above-identified patent and that said Letters Patent is hereby corrected as shown below:

On the Title Page

Item [71], delete "Collier Metal Specialties, Ltd." and insert -- Colmet LLC --

Signed and Sealed this
Second Day of September, 2025

Coke Morgan Stewart
*Acting Director of the United States Patent and Trademark Office*